(12) United States Patent
Sinha et al.

(10) Patent No.: US 12,443,638 B1
(45) Date of Patent: Oct. 14, 2025

(54) GENERALIZED VALIDATION FRAMEWORK FOR RETRIEVAL AUGMENTED GENERATION (RAG)

(71) Applicant: INTUIT INC., Mountain View, CA (US)

(72) Inventors: Ankita Sinha, Mountain View, CA (US); Karelia Del Carmen Pena-Pena, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/778,883

(22) Filed: Jul. 19, 2024

(51) Int. Cl.
 *G06F 16/33* (2025.01)
 *G06F 16/334* (2025.01)

(52) U.S. Cl.
 CPC .............................. *G06F 16/3347* (2019.01)

(58) Field of Classification Search
 CPC . G06F 16/3347; G06F 16/3344; G06F 16/334
 See application file for complete search history.

(56) References Cited

U.S. PATENT DOCUMENTS 12,282,504 B1 * 4/2025 Ganesh ................. G06F 16/383
2025/0131289 A1 * 4/2025 Larson ..................... G06N 5/02

OTHER PUBLICATIONS https://github.intuit.com/futures-emerging-tech/emerging.ai, May 14, 2024, pp. 1-14.
Santhosh, "Understanding BLEU and ROUGE score for NLP evaluation", Medium, https://medium.com/@sthanikamsanthosh1994/understanding-bleu-and-rouge-score-for-nlp-evaluation-1ab334ecadcb, Apr. 16, 2023, pp. 1-13.

* cited by examiner

*Primary Examiner* — Loc Tran
(74) *Attorney, Agent, or Firm* — DLA PIPER LLP US

(57) ABSTRACT

The method involves a process to validate text generated by a RAG system. The method receives text that the RAG system has rephrased in response to a query. The method finds and extracts relevant sections from a source document that match the rephrased text. Both the rephrased text and the source sections are transformed into semantic vectors using NLP techniques. A sliding window technique is applied to the source document vectors, moving sentence by sentence to calculate a semantic similarity score with the rephrased text at each step. Sentences are ranked by similarity, and the ones with the closest match are identified. If the similarity score is above a set threshold, the rephrased text is deemed semantically congruent and validated.

18 Claims, 6 Drawing Sheets

GENERALIZED VALIDATION FRAMEWORK FOR RETRIEVAL AUGMENTED GENERATION (RAG)

BACKGROUND

In the field of natural language processing (NLP), Retrieval Augmented Generation (RAG) systems have emerged as a powerful tool for extracting and rephrasing text from large databases. These systems leverage the capabilities of Large Language Models (LLMs) to interpret user queries, identify relevant sections within a comprehensive database, and generate responses in a user-friendly format. This process involves algorithms that transform the technical language of the source material into more accessible content, such as interview-style questions or explanations. The generated content is designed to directly address the user's initial query, providing him/her with the information sought in a comprehensible format.

However, the current state of the art in RAG systems presents several challenges. One of the primary issues is the detection and prevention of hallucinations, instances where the LLM generates text that is not supported by the source material. Traditional accuracy techniques rely on string matching or n-gram comparisons, which can be computationally intensive and less precise when validating specific information extracted by a RAG system. Furthermore, these methods may not fully capture the semantic congruence of the rephrased text with the original content, leading to potential inaccuracies in the generated output, which is undesirable. Therefore, there is a demand for a more efficient and accurate validation framework for RAG systems that can ensure the generated content is not just factually accurate but also contextually faithful to the source material.

SUMMARY

Embodiments disclosed herein solve the aforementioned technical problems and may provide other technical solutions as well. Contrary to conventional techniques, the disclosed solution includes a novel RAG validation method and system.

An example embodiment includes a method for validating a RAG system, comprising receiving rephrased text extracted from a database and rephrased by the RAG system in response to a user query, searching and extracting corresponding sections from an original document corresponding to the rephrased text, converting both the rephrased text and the corresponding sections of the original document into semantic vectors using natural language processing techniques, applying a sliding window to the vectorized form of the corresponding sections of the original document, systematically moving through sentences of the corresponding sections of the original document, calculating a semantic similarity score between the vectorized rephrased text and the vectorized text within the window for each position of the sliding window, ranking the sentences based on their semantic similarity scores, identifying the sentences that have a greatest semantic congruence with the rephrased text, and determining if the semantic similarity score meets or exceeds a predetermined threshold, considering the rephrased text as semantically congruent and thus validated if the score is above the threshold.

An example embodiment includes a system for validating a RAG system, the system comprising a processor configured to receive rephrased text extracted from a database and rephrased by the RAG system in response to a user query, search and extract corresponding sections from an original document corresponding to the rephrased text, convert both the rephrased text and the corresponding sections of the original document into semantic vectors using natural language processing techniques, apply a sliding window to the vectorized form of the corresponding sections of the original document, systematically moving through sentences of the corresponding sections of the original document, calculate a semantic similarity score between the vectorized rephrased text and the vectorized text within the window for each position of the sliding window, rank the sentences based on their semantic similarity scores, identify the sentences that have the greatest semantic congruence with the rephrased text, and determine if the semantic similarity score meets or exceeds a predetermined threshold, considering the rephrased text as semantically congruent and thus validated if the score is above the threshold.

BRIEF DESCRIPTION OF THE DRAWINGS

So that the present disclosure can be understood in detail, a more particular description of the disclosure, briefly summarized above, may be made by reference to example embodiments, some of which are illustrated in the appended drawings. It is to be noted, however, that the appended drawings illustrate only example embodiments of this disclosure and are therefore not to be considered limiting of its scope, for the disclosure may apply to other equally effective example embodiments.

DETAILED DESCRIPTION OF SEVERAL EMBODIMENTS

Figure 1:
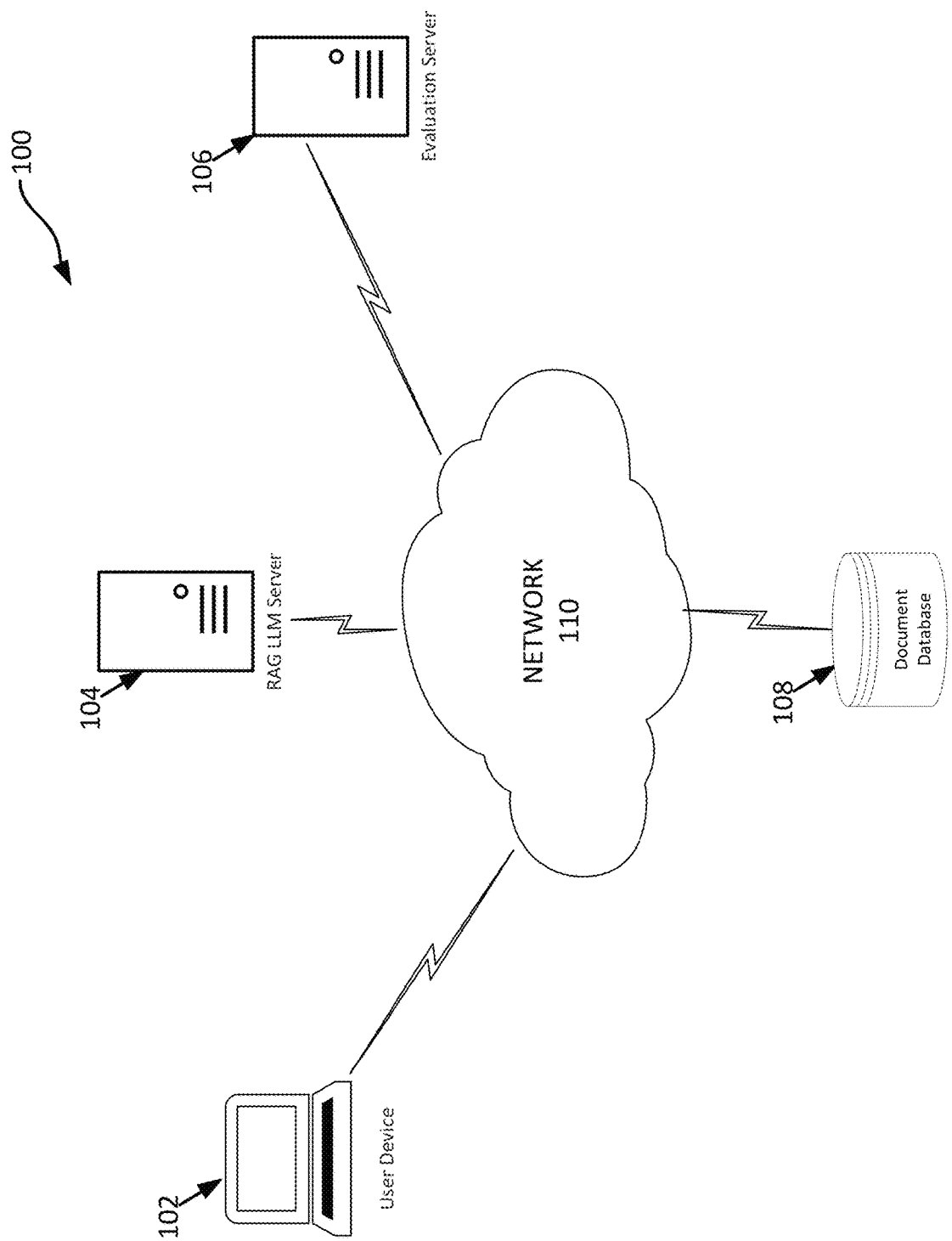
FIG. 1 illustrates a system diagram for document retrieval and evaluation, according to aspects of the present disclosure.

Various example embodiments of the present disclosure will now be described in detail with reference to the drawings. It should be noted that the relative arrangement of the components and steps, the numerical expressions, and the numerical values set forth in these example embodiments do not limit the scope of the present disclosure unless it is specifically stated otherwise. The following description of at least one example embodiment is merely illustrative in nature and is in no way intended to limit the disclosure, its application, or its uses. Techniques, methods, and apparatuses as known by one of ordinary skill in the relevant art may not be discussed in detail but are intended to be part of the specification where appropriate. In the examples illustrated and discussed herein, any specific values should be interpreted to be illustrative and non-limiting. Thus, other example embodiments may have different values. It is noted that similar reference numerals and letters refer to similar items in the figures, and once an item is defined for one figure, it is possible that it need not be further discussed for the other figures.

The present disclosure relates to a novel framework for validating the output of RAG systems, with a particular focus on addressing the challenge of hallucination detection in LLMs. RAG systems are instrumental in extracting and rephrasing text from extensive documentation, transforming complex information into a format that is more accessible and user-friendly. However, a persistent challenge in the operation of these systems is the detection of hallucinations, or instances where the LLM generates text that is not supported by the source material. The disclosed technology addresses this challenge by introducing a validation process that employs semantic similarity techniques. This process ensures that the generated content is not just factually accurate, but also contextually grounded in the source document, thereby enhancing the reliability of the information provided to end-users. Compared to conventional accuracy techniques such as BLEU (Bilingual Evaluation Understudy) or ROUGE (Recall-Oriented Understudy for Gisting Evaluation) scores, which rely on string matching and can be computationally intensive, the disclosed technology offers a more targeted and efficient approach to validation. By focusing on the semantic congruence of smaller text units within the context of the source document, the technology provides a more granular and contextually relevant validation, reducing computational load and enhancing the accuracy of the validation process.

Specifically, the framework detailed herein revolutionizes the validation of outputs from RAG systems, particularly addressing the technical challenge of hallucination detection in LLMs. In various software applications, LLMs are extensively employed to generate interview questions and explanations using a RAG-based framework. These applications necessitate the extraction of text from extensive documentation that aligns with user queries, which is then rewritten as interview questions or explanations. Given that these results are directly presented to the user, it is beneficial that the generated answers are free from hallucinations and firmly rooted in the underlying documents and information booklets. The disclosed innovation is a cornerstone in verifying tax content, instilling confidence that the LLM's output is accurate and that words have been added, updated, or deleted that could compromise the output's precision.

Traditional accuracy metrics like BLEU or ROGUE scores, which are based on string matching, are ineffective in a RAG-based system since LLMs tend to rephrase documents. Even minor changes, such as altering 'a' to 'the', could cause a traditional string-based matching algorithm to fail. In typical RAG-based systems, LLMs are prompted to extract and then rephrase text while preserving the meaning of the extracted text.

To verify the accuracy of the final rephrased output, the disclosed solution employs prompt engineering in two steps. Initially, the disclosed solution prompts the LLM to extract the precise portion of the document (e.g., tax booklet information) that corresponds to the query. Subsequently, the disclosed solution prompts the LLM to rephrase the output from the first step to produce the final answer. Since the output of the first step (extraction) ideally matches the document it was derived from (such as e.g., a tax information booklet), the disclosed solution uses the document as the source of truth to validate against hallucinations and to check the accuracy of the extracted answer. This is accomplished by segmenting the document into paragraphs and utilizing a fast semantic search library to retrieve the paragraphs that closely match the extracted answer. The disclosed solution selects the top three paragraphs and combines them. The disclosed solution divides the newly created document into overlapping windows of a length equal to that of the extracted answer. Both the query and paragraphs are converted into the same vector space using a pre-trained embedding model. The disclosed solution employs a similarity test (e.g., cosine similarity) to identify the window that has the greatest match with the query. Once the solution pinpoints the exact location and sentence that the LLM used to generate the final rephrased output, the solution uses a paraphrasing model to calculate the similarity between the extracted output sentence and the final output, yielding the final score.

In an illustrative example, the disclosed solution executes a sequence of operations as follows. The solution employs prompt engineering to facilitate output generation in a multi-step process. Initially, the solution directs the LLM to extract text that is relevant to the query during the extraction phase. Subsequently, the LLM is instructed to rephrase the extracted text to suit the user-specific use case during the rewrite phase. The validation of the output from the extraction phase is then conducted using a sliding window semantic similarity technique. Considering the extensive nature of documents (e.g., tax booklet documents), the solution begins by segmenting them into paragraphs, operating under the assumption that the extracted text will be no longer than one or two sentences, and therefore corresponds to a single paragraph. The extracted answer and the paragraphs are transformed into the same vector space, and the paragraphs are ranked according to their alignment with the extracted answer. The top N (e.g., three) paragraphs may be selected and merged to form a condensed document that contains text relevant to both the extracted answer and the query. The extracted answer and the paragraphs are preprocessed to remove punctuation and stop words. The answer is divided according to the window size of the extracted answer. During the extraction phase, it is anticipated that the length of the extracted answer matches the length of the sentence in the tax document. The split text and the extracted text are converted into an embedding space, and a cosine similarity analysis is performed between the extracted text and the split documents. This analysis is carried out in an overlapping, moving window manner. The split that achieves the top score is recognized as the actual sentence from the tax document that the LLM referenced to generate the answer. The cosine similarity score serves as an indicator of the degree of similarity between the extracted answer and the actual sentence in the document.

To assess the accuracy of the final stage output, the rewritten output, the solution converts the exact sentence from the document (the source of truth) and the rephrased output into the same vector space and performs a similarity (e.g., cosine similarity) analysis. The conversion to embeddings is executed by an embedding model specifically trained to handle rephrasing. This comprehensive approach ensures that the RAG system's output is not just factually accurate but also semantically aligned with the source material, thereby providing a robust solution to the challenge of hallucination detection in LLM outputs.

For instance, consider a scenario where a tax software company uses an LLM to assist users in filling out complex tax forms. The LLM generates interview questions and explanations based on a vast repository of tax documentation to guide users through the process. The disclosed technology validates the accuracy and reliability of the information provided by the LLM, ensuring that users are equipped with dependable guidance derived from authoritative tax documentation.

It is noted that the disclosed solution presents a practical application of a RAG system integrated with a validation system rooted in machine learning techniques. The solution applies the underlying algorithmic concepts to a specific technological process that improves the functionality of RAG systems. By employing a validation framework that leverages semantic similarity techniques, the technology ensures that the generated content is not just factually accurate but also contextually faithful to the source material. This practical application is also tied to a particular system of machines including the interconnected RAG and evaluation servers shown in FIG. 1.

Furthermore, the solution provides a technical solution to a technical problem-namely, the challenge of hallucination detection in LLMs used within RAG systems. The solution addresses this problem by introducing a validation process that employs semantic similarity techniques to ensure the generated content's semantic congruence with the source document. This process is a concrete application that enhances the reliability of information provided to end-users, as exemplified by the example tax domain use case.

In one example, the overall system 100 is shown in FIG. 1 to include a user device 102, such as a computer, smartphone, or tablet, is used to interact with a RAG LLM server 104 and a evaluation server 106. The user device 102, the RAG LLM server 104, and the evaluation server 106 are interconnected via a network 110, which may be a local area network (LAN), a wide area network (WAN), the internet, or any other suitable network. The RAG LLM server 104 and the evaluation server 106 are also connected to a document database 108, which stores a repository of documentation (e.g. tax documentation).

In some cases, the user device 102 may include a user interface (not shown) that allows a user to submit a natural language query related to a specific domain (e.g. tax information such as deductions, etc.). The query is transmitted over the network 110 to the RAG LLM server 104. The RAG LLM server 104 is configured to interpret the natural language query and identify relevant sections within the document database 108 that correspond to the user's query.

Upon identifying the relevant sections, the RAG LLM server 104 extracts the corresponding text from the document database 108. This extraction process may involve the use of prompt engineering techniques, which guide the LLM in the RAG system to extract the exact part of the tax booklet information that matches the query.

Once the relevant text has been extracted, the RAG LLM server 104 rephrases the extracted text into a user-friendly format. This rephrasing process may involve the use of sophisticated algorithms that transform the technical language of the tax documentation into a format that is more accessible to the user, such as interview questions or explanations.

The rephrased text is transmitted over the network 110 to the evaluation server 106 for validation. The evaluation server 106 is configured to validate the rephrased text using a sliding window semantic similarity technique. This technique involves breaking the original document into paragraphs, converting both the rephrased text and the corresponding sections of the original document into semantic vectors using natural language processing techniques, and applying a sliding window to the vectorized form of the original document to systematically move through sentences of the corresponding sections of the original document.

The evaluation server 106 calculates a semantic similarity score between the vectorized rephrased text and the vectorized text within the window for each position of the sliding window. The sentences are ranked based on their semantic similarity scores, and the sentence that has the greatest semantic congruence with the rephrased text is identified. If the semantic similarity score meets or exceeds a predetermined threshold, the rephrased text is considered semantically congruent and thus validated.

The validated rephrased text is transmitted back to the user device 102 over the network 110, where it is presented to the user through the user interface. The user can then use the validated rephrased text to gain a better understanding of the tax deductions related to his/her query.

In some cases, the system may also include a feedback loop that uses the accuracy score from the validation process to further train the LLM, enhancing its performance for future queries. This feedback loop may involve adjusting the LLM's training data or algorithms based on the accuracy score and performance analysis, thereby facilitating continuous improvement of the LLM RAG solution.

Figure 2:
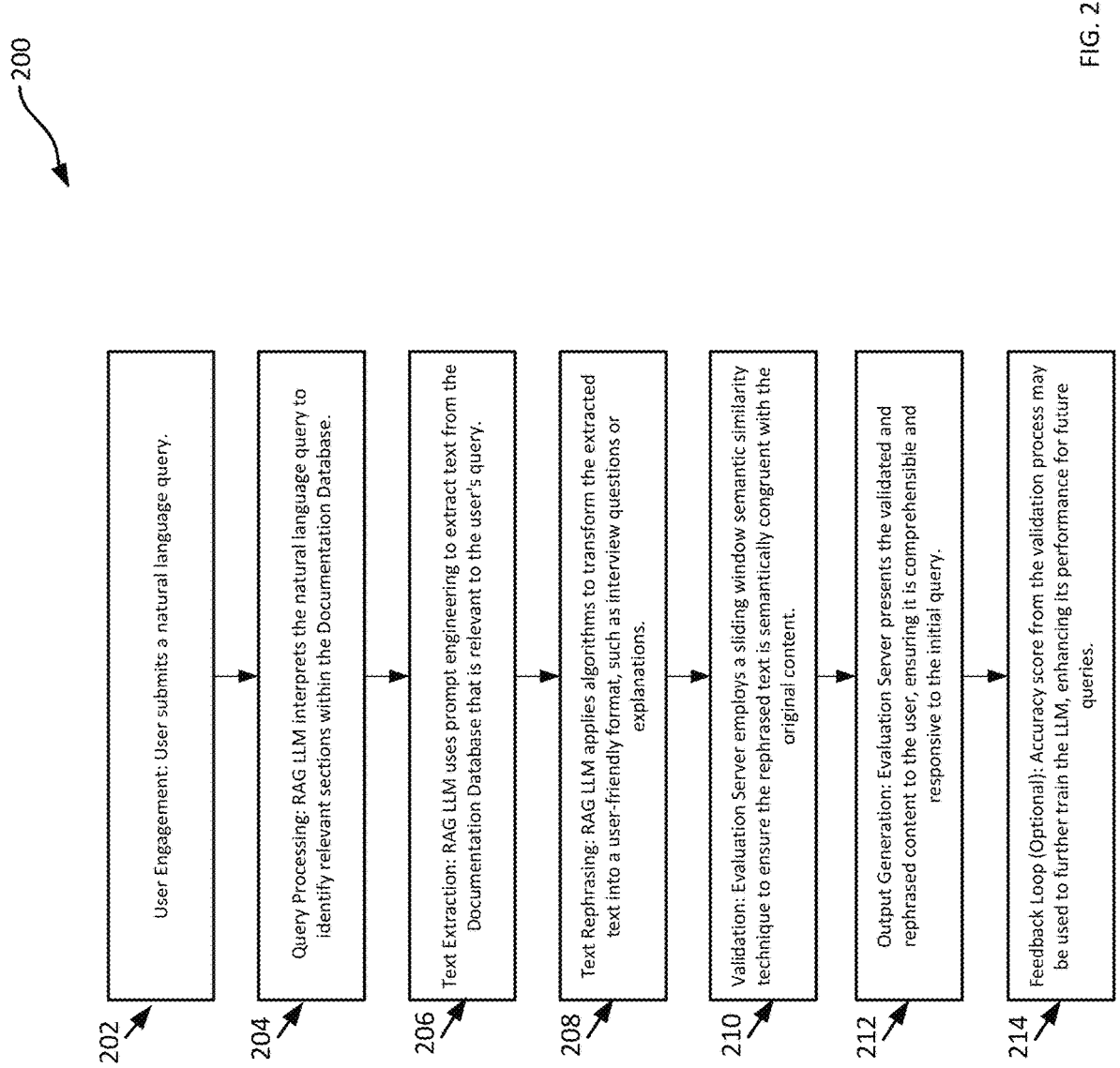
FIG. 2 shows an operational flowchart for processing user queries, according to an embodiment.

Referring to the overall operational flowchart shown in FIG. 2, the disclosed process 200 begins with a user engagement step 202. For illustration purposes only, the process 200 is described in relation to a user's interaction with a tax application. In this step, a user interacts with a user interface on a user device 102, such as a computer, smartphone, or tablet, to submit a natural language query related to a specific aspect of tax deductions. The query may be phrased in a manner that captures the user's specific informational requirements or uncertainties regarding tax filing procedures. For instance, a user may submit a query asking, "What are the tax deductions available for homeowners?"

The process 200 proceeds to a query processing step 204. In this step, the RAG LLM server 104 interprets the natural language query and identifies relevant sections within the document database 108 that correspond to the user's query. The RAG LLM server 104 may employ advanced natural language processing techniques to accurately pinpoint the text within the vast repository of tax documentation that matches the user's inquiry.

In the text extraction step 206, the RAG LLM server 104 uses prompt engineering techniques to extract the relevant text from the document database 108. Prompt engineering involves guiding the LLM in the RAG system to extract the exact part of the tax booklet information that matches the query. For example, if the user's query pertains to tax deductions for homeowners, the RAG LLM server 104 may extract sections of tax documentation that provide detailed information on this topic.

The process 200 moves to the text rephrasing step 208. In this step, the RAG LLM server 104 applies rephrasing algorithms to transform the extracted text into a format that is more accessible to the user. This may involve creating interview-style questions that facilitate user interaction or generating explanations that clarify complex tax concepts, while preserving the original meaning and intent of the source material.

The rephrased text, having been extracted from a database and transformed by the RAG system in response to a user query, undergoes a validation step 210. This step ensures that the rephrased text maintains semantic congruence with the source content. The validation employs a sliding window semantic similarity technique, where the original document is first segmented into paragraphs, allowing for a more concentrated and effective validation process. Subsequently, both the rephrased text and the corresponding sections of the original document are converted into semantic vectors through natural language processing techniques, which may encompass tokenization, stemming, lemmatization, part-of-speech tagging, and named entity recognition. This conversion facilitates a nuanced comparison, capturing the semantic essence of the content.

A sliding window is applied to the vectorized form of the original document, traversing the sentences of the corresponding sections. The size of the sliding window is adaptable, contingent on the sentence lengths in the rephrased text, to enable a precise comparison. The process 200 advances to the output generation step 212. Here, the validated and rephrased content is prepared for presentation to the user, ensuring it is both easily understandable and responsive to the initial query. This step ensures that the information provided is not merely factually accurate but also contextually anchored in the source document, thus bolstering the reliability of the information. The output, tailored to directly address the user's query, is delivered in a format that is both comprehensible and user-friendly, enhancing the user experience by providing dependable and contextually pertinent information.

In one example, the sliding window semantic similarity technique is further refined by employing a dynamic window size adjustment mechanism. This mechanism allows the window size to be tailored to the length of the rephrased text, ensuring that the comparison between the rephrased text and the original document is as precise as possible. For example, if the rephrased text is a single sentence, the sliding window may be set to encompass a single sentence length within the original document. Conversely, if the rephrased text spans multiple sentences, the window size can be expanded to cover a larger section of the document, thereby capturing the full context of the rephrased content.

The semantic vectors may be generated using advanced embedding techniques such as Word2Vec, GloVe, or BERT, which capture the underlying meanings of words and phrases beyond their surface-level representations. These embeddings are designed to represent the text in a high-dimensional space where semantically similar phrases are positioned closer together, facilitating a more accurate assessment of semantic similarity.

To calculate the semantic similarity score, the evaluation server may employ a similarity test such as cosine similarity, which measures the cosine of the angle between two vectors in the embedding space. A score of 1 indicates perfect semantic congruence, while a score of 0 indicates no semantic congruence. The cosine similarity measure is particularly effective in this context as it is insensitive to the magnitude of the vectors, focusing purely on the orientation, which is a proxy for semantic content.

Semantic congruence is determined by comparing the semantic similarity score against a predetermined threshold, which may be established based on empirical data or domain-specific requirements. For example, a threshold of 0.8 may be set to ensure a high level of confidence in the validation process. If the score exceeds this threshold, the rephrased text is considered to have a high degree of semantic congruence with the source content, affirming its validity.

In practice, consider a user query such as "How can I deduct home office expenses on my taxes?" The RAG system may extract and rephrase text from the tax documentation to provide a clear and concise answer. The evaluation server applies the sliding window technique to the original document, comparing the rephrased answer to the source content. If the rephrased text is "Home office expenses can be deducted if the space is used regularly and exclusively for work," the evaluation server seeks a section in the tax document that semantically aligns with this statement. Through the sliding window analysis, it may identify a sentence such as "If you use part of your home for business, you may be able to deduct expenses for the business use of your home," which, when vectorized and compared, yields a high semantic similarity score, validating the rephrased text.

This enhanced validation process ensures that the RAG system's output is not just factually accurate but also semantically congruent with the authoritative source material, providing users with reliable and contextually relevant information.

In some cases, the system may also include a feedback loop step 214. This optional step uses the accuracy score from the validation process to further train the LLM, enhancing its performance for future queries. This feedback loop may involve adjusting the LLM's training data or algorithms based on the accuracy score and performance analysis, thereby facilitating continuous improvement of the LLM.

The feedback loop step 214 serves as a mechanism for the continuous refinement of the RAG system's performance. By incorporating user interactions and validation outcomes into the learning process, the system can evolve and adapt to provide more accurate and contextually relevant responses over time. The accuracy score, derived from the semantic similarity scores and potentially augmented by user feedback, acts as a quantitative measure of the system's performance. This score is instrumental in identifying the strengths and weaknesses of the LLM's current knowledge base and processing capabilities.

When the accuracy score falls short of the desired threshold, it signals an opportunity for improvement. The system may analyze the instances where the semantic congruence was deemed insufficient and examine the characteristics of these cases. This analysis can uncover patterns or commonalities in errors, such as specific linguistic structures that are consistently misunderstood or particular topics that require better representation in the training data.

Based on these insights, the system can adjust the LLM's training data by incorporating new examples that address identified gaps or by emphasizing challenging areas. Additionally, the algorithms that underpin the LLM's processing may be fine-tuned to enhance its understanding and generation of text. For example, if the system consistently struggles with queries related to a niche area of tax law, additional documentation and examples from that area can be added to the training set to improve the LLM's expertise in that domain.

Furthermore, the feedback loop can also involve retraining the LLM with an updated corpus of text that includes recent changes in tax legislation or new tax-related scenarios. By doing so, the system ensures that the LLM remains current and capable of handling queries that reflect the latest tax laws and guidelines.

In essence, the feedback loop step 214 embodies the principle of machine learning, where the system learns from its experiences and iteratively enhances its performance. This dynamic learning process not just bolsters the accuracy of the RAG system but also contributes to a more personalized and efficient user experience, as the system becomes increasingly adept at addressing the specific informational requirements of each user.

Figure 3:
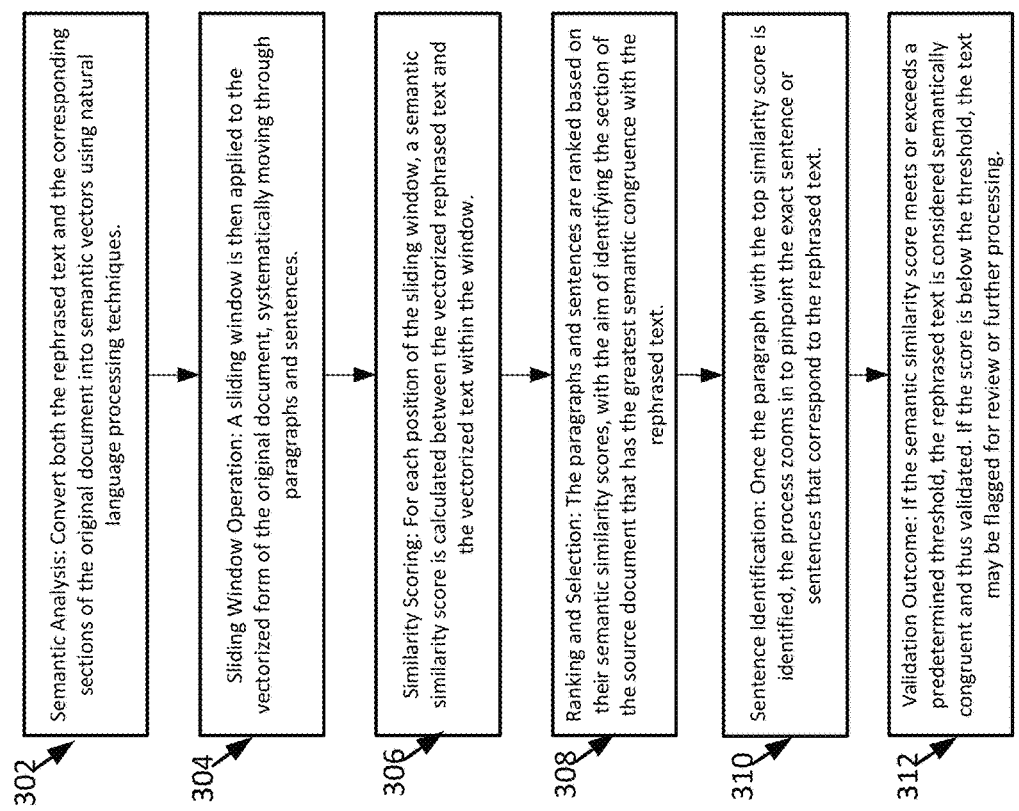
FIG. 3 shows a validation flowchart for semantic congruence of rephrased text, according to aspects of the present disclosure.

Referring now to the validation flowchart shown in FIG. 3, the validation process 300 begins with a semantic analysis step 302. In this step, the evaluation server 106 converts both the rephrased text and the corresponding sections of the original document into semantic vectors using natural language processing techniques. These techniques may include, but are not limited to, tokenization, stemming, lemmatization, part-of-speech tagging, and named entity recognition. The conversion to semantic vectors allows for a more nuanced comparison of the rephrased text and the original document, capturing the semantic content beyond mere word overlap.

More specifically, in the semantic analysis step 302, the evaluation server 106 undertakes a multi-faceted transformation process to convert the rephrased text and the corresponding sections of the original document into semantic vectors. Initially, the text undergoes tokenization, where it is segmented into individual words or phrases, which serve as the basic units for further analysis. Stemming is then applied to reduce words to their root forms, enabling the system to recognize different grammatical variations of a word as a single entity. Lemmatization goes a step further by considering the context to convert words into their canonical forms, or lemmas, based on their intended meaning. Part-of-speech tagging assigns grammatical categories to each token, such as noun, verb, or adjective, which helps in understanding the syntactic structure of the text. Named entity recognition identifies and classifies entities present in the text, such as names of people, organizations, or locations, which can be particularly relevant in understanding the specific content of the text. These processed tokens are transformed into high-dimensional semantic vectors using advanced embedding models that capture the contextual meanings of words and phrases, enabling the system to perform a nuanced semantic comparison between the rephrased text and the original document.

The process 300 proceeds to a sliding window operation step 304. In this step, the evaluation server 106 applies a sliding window to the vectorized form of the corresponding sections of the original document. The sliding window systematically moves through sentences of the corresponding sections of the original document. The size of the sliding window may be adjusted based on the length of the sentences in the text rephrased by the RAG system, allowing for a more precise comparison of the rephrased text and the original document.

More specifically, in the sliding window operation step 304, the evaluation server 106 executes a meticulous process where a computational window is superimposed on the vectorized form of the original document's text. This window dynamically traverses the document's sentences. The size of this window is not arbitrary but is intelligently adjusted to align with the length of the rephrased text generated by the RAG system. If the rephrased text is brief, the window narrows to encapsulate a smaller textual segment, ensuring a focused and direct comparison. Conversely, for more extensive rephrased text, the window expands, encompassing a larger textual area to maintain the integrity of the context during comparison. This adaptive sizing is beneficial as it ensures that the semantic vectors of the rephrased text and the original document are compared within a contextually relevant frame, enhancing the precision of the semantic similarity assessment.

Next, in the similarity scoring step 306, the evaluation server 106 calculates a semantic similarity score between the vectorized rephrased text and the vectorized text within the window for each position of the sliding window. The semantic similarity score may be calculated using a cosine similarity measure, a Jaccard index, or a Euclidean distance, among other possible measures. This score quantifies the degree of semantic congruence between the rephrased text and the original document, providing a metric for the accuracy of the rephrased text.

More specifically, during the similarity scoring step 306, the evaluation server 106 performs a detailed computation to ascertain the semantic similarity score, which is a quantitative indicator of the semantic congruence between the rephrased text and the original document. To achieve this, the server employs algorithms that calculate the cosine similarity measure, Jaccard index, or Euclidean distance between the semantic vectors of the rephrased text and the text within the sliding window. The cosine similarity measure is particularly advantageous as it evaluates the cosine of the angle between two vectors, effectively measuring their orientation in the semantic space rather than their magnitude, which correlates to the semantic content. The Jaccard index, on the other hand, assesses the similarity between sample sets, and the Euclidean distance measures the straight-line distance between points in the vector space. Each of these measures provides a distinct perspective on the semantic relationship between the texts, and the evaluation server may select the measure that is the most appropriate for the specific context of the rephrased text. The resulting score is used to determine if the rephrased text maintains a high degree of semantic congruence with the source material, ensuring the accuracy and reliability of the RAG system's output.

The process 300 then moves to a ranking and selection step 308. In this step, the evaluation server 106 ranks the sentences based on their semantic similarity scores. The sentences may be ranked using a machine learning model trained to prioritize sentences based on contextual relevance to the user query. The sentence that has the greatest semantic congruence with the rephrased text is identified. This sentence represents the section of the source document that the LLM's output is based on, providing a direct link between the generated content and the source material.

More specifically, in the ranking and selection step 308, the evaluation server 106 utilizes a machine learning model that has been specifically trained to evaluate and prioritize sentences from the original document based on their contextual relevance to the user's query. This model operates on the semantic vectors derived from the text, applying sophisticated algorithms to discern the nuances of meaning and context. The sentences are ranked according to their semantic similarity scores, which have been computed in the previous step. The top-ranking sentences are those that exhibit the greatest semantic congruence with the rephrased text, indicating a high likelihood that they are the source material from which the LLM's output was derived. By identifying the sentence with the maximum semantic similarity score in step 310, the system establishes a direct link between the rephrased text provided to the user and the authoritative content in the original document, thereby validating the accuracy and contextual integrity of the RAG system's output.

In the validation outcome step 312, the evaluation server 106 determines if the semantic similarity score meets or exceeds a predetermined threshold. If the score is above the threshold, the rephrased text is considered semantically congruent and thus validated. If the score is below the threshold, the text may be flagged for review or further processing. The predetermined threshold may be dynamically adjusted based on historical validation outcomes for similar types of rephrased text, allowing for continuous improvement of the validation process.

More specifically, in the validation outcome step 312, the evaluation server 106 employs a decision-making algorithm to ascertain whether the semantic similarity score surpasses a predefined benchmark. This threshold is dynamically calibrated, taking into account the historical performance of the system on analogous rephrased texts. When the semantic similarity score exceeds this adaptive threshold, the rephrased text is deemed semantically congruent with the source material, affirming its validity. Conversely, if the score falls short, the rephrased text is earmarked for further scrutiny or refinement. This dynamic adjustment of the threshold is a form of machine learning, enabling the system to evolve by learning from past validations, thereby progressively enhancing the precision and reliability of the RAG system's outputs.

Consider a successful validation scenario where the RAG LLM server 104 processes a query such as, "Can I claim energy efficiency improvements as tax deductions?" The server extracts text from the tax documentation that it deems relevant and rephrases it for the user. During the validation process, the semantic similarity score between the rephrased text and the original document meets or exceeds the predetermined threshold. For instance, the RAG system may generate a rephrased text stating, "Energy efficiency improvements for your home may be eligible for tax deductions under specific conditions," which upon validation, is found to have a high degree of semantic congruence with the source material. The original document may state, "You may be able to deduct expenses for home energy efficiency improvements if they meet the IRS criteria for energy conservation." The semantic similarity score is high, indicating a strong alignment between the rephrased text and the source document. As a result, the rephrased text is validated, confirming that the information provided to the user is both factually accurate and contextually grounded in the tax documentation, thereby enhancing the reliability of the information.

In contrast to the successful validation scenario, consider a situation where the RAG LLM server 104 processes a query such as, "Can I claim energy efficiency improvements as tax deductions?" The server extracts text from the tax documentation that it deems relevant and rephrases it for the user. However, during the validation process, the semantic similarity score between the rephrased text and the original document does not meet the predetermined threshold. For instance, the RAG system may generate a rephrased text stating, "All energy efficiency improvements to your home are eligible for tax deductions," which upon validation, is found to lack sufficient semantic congruence with the source material. The original document may actually state, "Some energy efficiency improvements may qualify for tax credits, subject to specific IRS guidelines and limitations." Since the rephrased text suggests a broader applicability of deductions than what is supported by the source document, the semantic similarity score is low, indicating a discrepancy. Consequently, the rephrased text is flagged as not validated, prompting a review or additional processing to ensure the information provided to the user accurately reflects the tax documentation and is contextually reliable.

Figure 4:
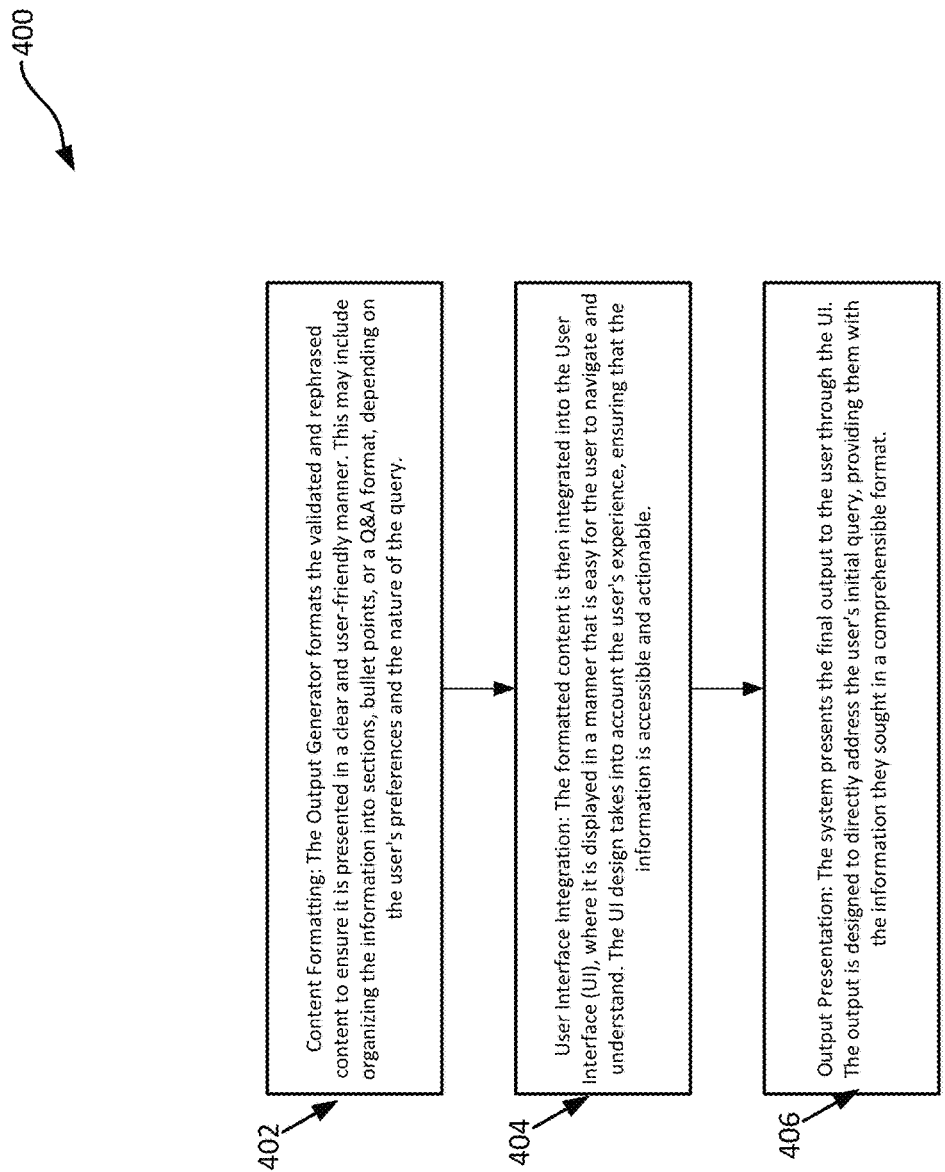
FIG. 4 shows an output generation flowchart for presenting user-friendly content, in accordance with example embodiments.

Referring now to the output generation flowchart shown in FIG. 4, the process 400 begins with a content formatting step 402, that employs advanced formatting algorithms to enhance the clarity and readability of the validated and rephrased content. The algorithms analyze the structure and complexity of the information, determining the optimum way to present it to the user. For example, complex data may be broken down into a series of digestible bullet points, while a narrative explanation might be formatted into a flowing paragraph structure. Additionally, the step may apply typographical emphasis, such as bolding or italicizing keywords, to draw the user's attention to the salient points. The choice of formatting is dynamically determined by the nature of the content and the user's preferences, which may be inferred from his/hers interaction history or explicitly selected in user settings.

Furthermore, the formatting step is configured to adapt the presentation of the content based on the device being used by the user. Recognizing that users may access the information on a variety of devices with different screen sizes and capabilities, from desktop computers to mobile phones, the formatting algorithms ensure that the content is responsive and maintains its usability across platforms. This involves adjusting the layout, font sizes, and interactive elements to provide a seamless experience, whether the user is scrolling through the information on a smartphone or reviewing it on a larger desktop display.

During the user interface integration step 404, the system's UI design is meticulously crafted to facilitate an intuitive and engaging user experience. The integration process involves embedding the formatted content into the UI framework, ensuring that it is presented within the context of the overall application design. The integration also involves testing the interactivity of the content, such as verifying the functionality of hyperlinks, ensuring that drop-down menus populate correctly, and confirming that any dynamic content, like collapsible sections, operates smoothly.

In addition to the basic integration, the UI is designed to be adaptive, providing personalized experiences based on user behavior and preferences. Machine learning algorithms may be employed to analyze user interactions and tailor the UI presentation accordingly. For instance, if a user frequently accesses a particular type of information, the UI may prioritize that content in future sessions. The system also ensures compliance with accessibility standards, enabling users with disabilities to interact with the content effectively. This includes providing alternative text for images, ensuring keyboard navigability, and supporting screen reader technology.

The output presentation step 406 involves the final delivery of the content to the user through the UI. This step is not merely a static display of information but an interactive process that engages the user with the content. The system employs dynamic content rendering techniques to ensure that the information is presented in real-time, reflecting any updates or changes to the underlying data. For example, if the tax laws change, the system can immediately update the presented information to maintain accuracy. The presentation layer is also equipped with analytics capabilities, tracking user engagement with the content to gather insights into its effectiveness and areas for improvement.

Moreover, the output presentation is designed to facilitate user action based on the provided information. If the content includes guidance on claiming tax deductions, the system may offer direct links to the relevant forms or additional resources. The UI may also provide contextual help or tooltips to assist users in understanding complex information. The goal of this step is to ensure that the user not just receives the information but is also empowered to act upon it with confidence. The system's design considers the end-to-end user journey, from the initial query to the completion of the user's goal, whether it be filling out a tax form or understanding a tax concept.

In a specific use case example in the tax domain, a user may submit a query asking, "What are the tax deductions available for homeowners?" The RAG LLM server 104 extracts the relevant text from the tax documentation and rephrases it into a user-friendly format. The rephrased text is then validated using the process described above. The validated rephrased text is formatted into a series of bullet points, integrated into the UI, and presented to the user. This ensures that the information provided to the user is not just factually accurate, but also contextually grounded in the source document, enhancing the reliability of the information.

Figure 5:
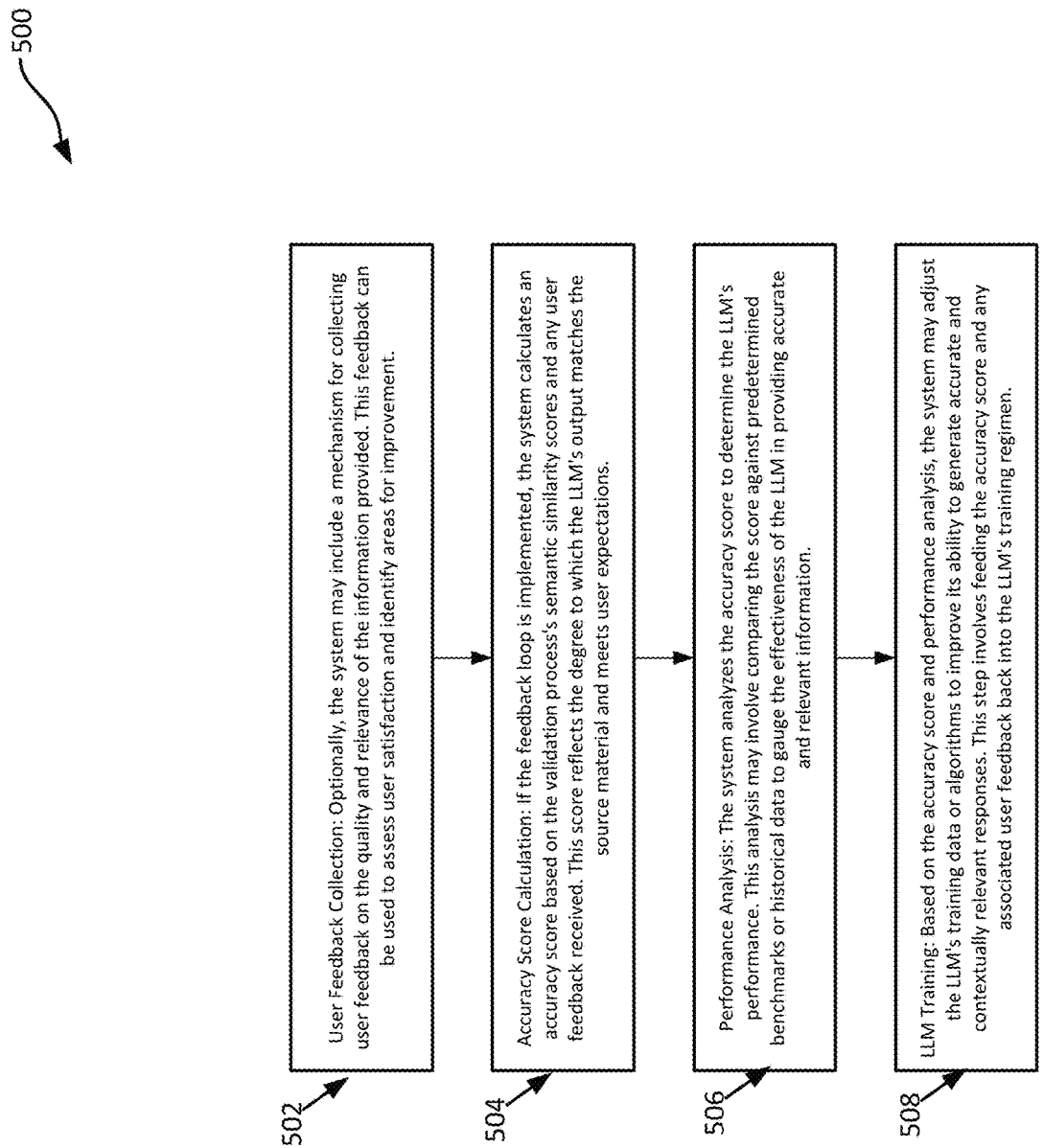
FIG. 5 shows an LLM training flowchart for improving system performance, according to an aspect of the present disclosure.

Referring now to the LLM training flowchart shown in FIG. 5, the process 500 begins with a user feedback collection step 502. In this step, the system may include a mechanism for collecting user feedback on the quality and relevance of the information provided. This feedback can be used to assess user satisfaction and identify areas for improvement. For instance, if a user finds the rephrased text to be unclear or inaccurate, he/she can provide feedback to that effect. This feedback is used to inform the subsequent steps of the process, helping to refine the performance of the LLM.

Building upon the user feedback collection step 502, the system may incorporate a feedback mechanism that utilizes both explicit and implicit user feedback channels. Explicit feedback may be gathered through user interfaces that allow for direct input, such as rating scales, comment boxes, or structured surveys where users can articulate their satisfaction with the rephrased text and its relevance to their query. Implicit feedback, on the other hand, may be derived from user behavior analytics, such as the frequency of use, time spent on particular responses, and patterns of user interaction with the system, which can indicate the perceived value of the information provided. Advanced machine learning algorithms, such as natural language processing and sentiment analysis, can be employed to analyze open-ended feedback, extracting actionable insights and quantifying user sentiment. This multifaceted feedback is aggregated and processed to generate a comprehensive user satisfaction index, which is then correlated with specific aspects of the LLM's performance. The insights gained from this analysis are used to fine-tune the LLMs training datasets, adjust its response generation algorithms, and enhance the overall system architecture. By continuously integrating user feedback into the LLM's learning cycle, the system evolves to produce more accurate, contextually relevant, and user-centric responses, thereby improving the efficacy of the RAG system and user trust in the generated content.

Following the user feedback collection step 502, the process 500 proceeds to an accuracy score calculation step 504. In this step, the system calculates an accuracy score based on the validation process's semantic similarity scores and any user feedback received. This score reflects the degree to which the LLM's output matches the source material and meets user expectations. For example, if the rephrased text closely matches the original document and is deemed helpful by the user, the accuracy score would be high. Conversely, if the rephrased text deviates from the original document or does not meet the user's informational requirements, the accuracy score would be lower.

In the accuracy score calculation step 504, the system employs a composite metric that combines quantitative semantic analysis with qualitative user feedback to derive a comprehensive accuracy score. This score is calculated by first quantifying the degree of semantic alignment between the rephrased text and the source material using advanced natural language processing algorithms. These algorithms may include vector space modeling, where text is represented as high-dimensional vectors, and similarity measures such as cosine similarity, which assesses the cosine of the angle between two vectors to determine their closeness in semantic space. The user feedback component incorporates both direct user ratings and indirect behavioral indicators, such as the time spent reviewing the rephrased text or the frequency of follow-up queries, which can signal user satisfaction or confusion. Machine learning models, trained on a dataset of user interactions and feedback, analyze these inputs to predict the user-perceived quality of the rephrased text. The final accuracy score is a weighted amalgamation of these elements, reflecting both the objective fidelity of the rephrased text to the source material and its subjective utility to the user. This dual-faceted approach ensures that the score encapsulates the full spectrum of the system's performance, guiding targeted improvements in the RAG system's extraction and rephrasing capabilities.

In the performance analysis step 506, the system analyzes the accuracy score to determine the LLM's performance. This analysis may involve comparing the score against predetermined benchmarks or historical data to gauge the effectiveness of the LLM in providing accurate and relevant information. For instance, if the accuracy score consistently falls below a predetermined threshold, this may indicate that the LLM's performance is subpar and would benefit from improvement.

In the performance analysis step 506, the system's analytical engine delves into the intricacies of the accuracy score, juxtaposing it against established benchmarks or a repository of historical performance data. This comparative analysis is not merely a superficial check but a deep dive into the patterns and trends of the LLM's outputs. For example, the system may utilize statistical models to identify variances and anomalies in the accuracy scores over time, which could signal underlying issues with the LLM's training data, algorithmic biases, or its adaptability to evolving language usage patterns. If the accuracy score is found to be consistently below a predetermined threshold, it triggers an alert for potential performance degradation. The system may then initiate diagnostic protocols to pinpoint the root cause, such as insufficient training data in a particular domain, outdated information in the knowledge base, or a lack of diversity in the training examples. Addressing these issues may involve augmenting the training dataset with new, high-quality examples, retraining the LLM with updated algorithms that better capture the nuances of language, or refining the system's feature extraction techniques to improve its understanding of complex queries. This rigorous approach to performance analysis ensures that the LLM's ability to generate accurate and relevant information is not just maintained but continuously enhanced, aligning with the evolving expectations and requirements of the users.

The process 500 moves to the LLM training step 508. Based on the accuracy score and performance analysis, the system may adjust the LLM's training data or algorithms to improve its ability to generate accurate and contextually relevant responses. This step involves feeding the accuracy score and any associated user feedback back into the LLM's training regimen. For example, if the accuracy score indicates that the LLM tends to generate rephrased text that deviates from the original document, the training data or algorithms may be adjusted to prioritize semantic congruence with the source material.

In the LLM training step 508, the system's processor may utilize sophisticated machine learning techniques to refine the LLM's training regimen, incorporating the accuracy score and user feedback into the model's learning process. For instance, if the accuracy score reveals a tendency for the LLM to produce rephrased text that diverges from the source material, the training data can be enriched with additional examples that emphasize semantic congruence. This may involve curating a dataset with a higher proportion of text pairs that are semantically close yet lexically diverse, training the LLM to recognize and preserve the core meaning of the source material while allowing for syntactic flexibility. Additionally, the algorithms themselves may be optimized, such as by adjusting the weights in a neural network or modifying the architecture to enhance the model's focus on semantic accuracy. Reinforcement learning techniques could also be employed, where the LLM is rewarded for generating outputs that align closely with the source material, iteratively improving its performance. By systematically integrating these technical adjustments, the system ensures that the LLM's output becomes increasingly aligned with the original documents, thereby improving the quality and reliability of the rephrased text provided to users.

In a specific use case example in the tax domain, a user may submit a query asking, "What are the tax deductions available for homeowners?" The RAG LLM server 104 extracts the relevant text from the tax documentation and rephrases it into a user-friendly format. The rephrased text is then validated using the process described above. In the event that a user perceives the rephrased text as unclear or inaccurate, he/she is empowered to offer feedback through an interactive component of the user interface, such as a feedback button or a comment section, which prompts them to detail their concerns or rate the information. This user-provided feedback is then channeled into a feedback analysis module, where it is systematically evaluated to discern patterns or specific issues with the rephrased text. The feedback analysis module may employ sentiment analysis to gauge the tone of user comments and machine learning algorithms to classify feedback into categories such as clarity, accuracy, or relevance. The system aggregates this feedback to form an accuracy score that reflects the user's perceived quality of the rephrased text. This score, along with the detailed feedback, informs the LLM's continuous learning process. The system's processor, leveraging the feedback, may adjust the LLM's training data to include more representative examples or refine the algorithms to better handle the nuances identified in the feedback. This iterative process not only tailors the LLM's responses to be more aligned with user expectations but also enhances the overall system's ability to deliver precise and contextually appropriate content, thereby fostering a cycle of improvement and user satisfaction.

Figure 6:
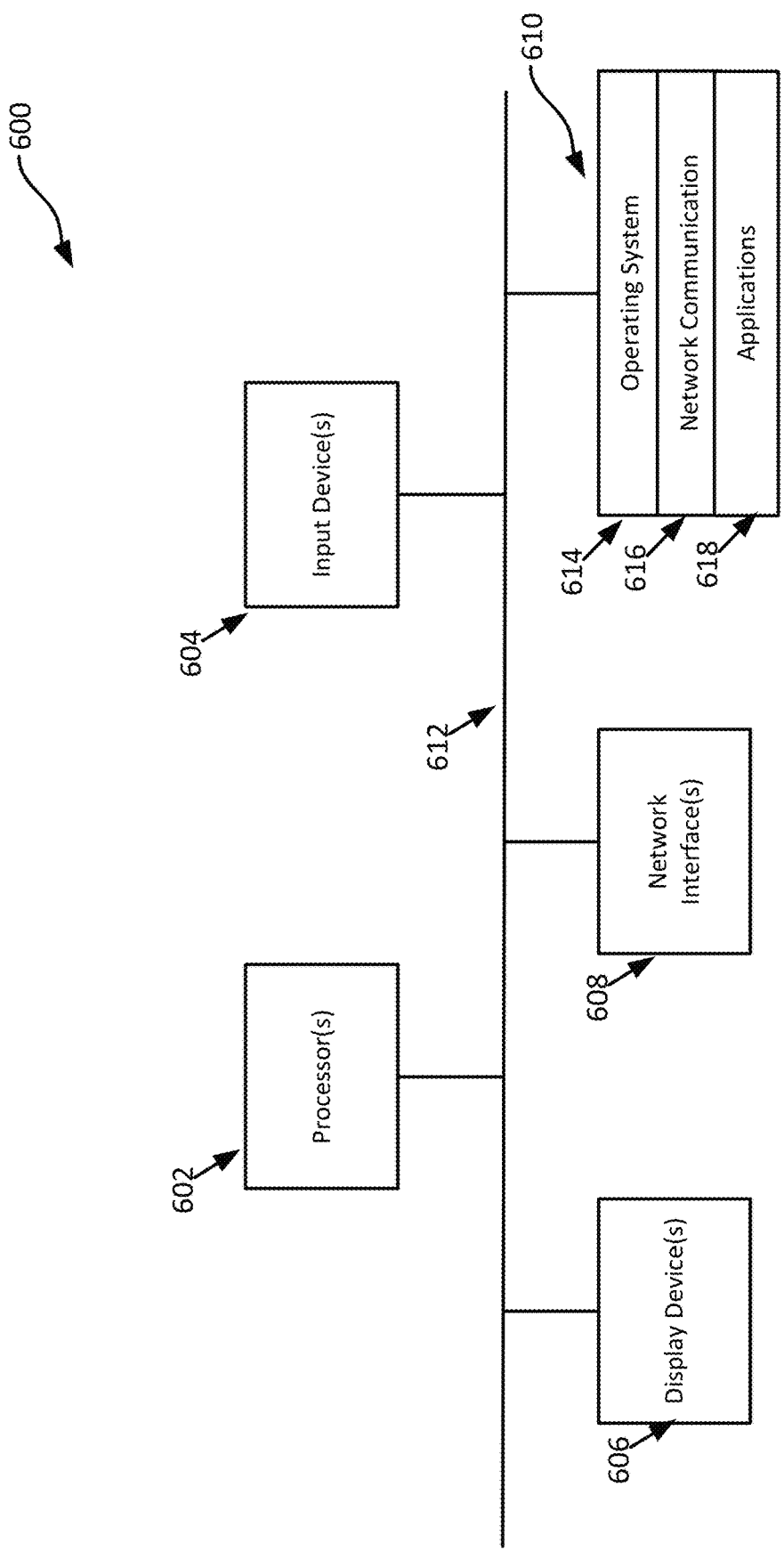
FIG. 6 shows a block diagram of a computer hardware system, according to aspects of the present disclosure.

Referring to the computer hardware system 600 depicted in FIG. 6, the system includes various components that facilitate the operation of the RAG system and the validation process. The computer hardware system 600 is an example of the type of computer hardware embodied by the computers and databases shown in FIG. 1.

The computer hardware system 600 includes one or more processor(s) 602. In some cases, the processor(s) 602 may be a central processing unit (CPU), a graphics processing unit (GPU), or any other type of processing unit capable of executing instructions and processing data. The processor(s) 602 may be configured to execute the various operations involved in the RAG system and the validation process, including the extraction and rephrasing of text, the conversion of text into semantic vectors, the application of the sliding window operation, the calculation of semantic similarity scores, and the ranking and selection of sentences.

The computer hardware system 600 also includes one or more input device(s) 604. The input device(s) 604 may include a keyboard, a mouse, a touchscreen, a microphone, or any other device that allows a user to input data or commands into the computer hardware system 600. In some cases, the input device(s) 604 may be used by a user to submit a natural language query to the RAG system.

The computer hardware system 600 further includes one or more display device(s) 606. The display device(s) 606 may include a monitor, a projector, a touchscreen, or any other device that provides a visual output. In some cases, the display device(s) 606 may be used to present the validated and rephrased content to the user.

The computer hardware system 600 also includes one or more network interface(s) 608. The network interface(s) 608 may include a network card, a modem, or any other device that enables the computer hardware system 600 to communicate with other systems or devices over a network. In some cases, the network interface(s) 608 may facilitate communication between the computer hardware system 600, the RAG LLM server 104, the evaluation server 106, and the document database 108.

The computer hardware system 600 further includes software components 610. The software components 610 may include an operating system 614, network communication software 616, and various applications 618. The operating system 614 manages the hardware resources of the computer hardware system 600 and provides services for the software components 610. The network communication software 616 facilitates communication over the network. The applications 618 may include the RAG system, the validation process, and any other software applications used in the operation of the system.

All of these components are interconnected via a system bus 612. The system bus 612 facilitates communication between the processor(s) 602, the input device(s) 604, the display device(s) 606, the network interface(s) 608, and the software components 610. In some cases, the system bus 612 may be a single bus or a combination of different types of buses.

In some aspects, the computer hardware system 600 may be configured to perform the various operations involved in the RAG system and the validation process. For example, the processor(s) 602 may execute instructions to extract and rephrase text from a document database, convert the rephrased text and the corresponding sections of the original document into semantic vectors, apply a sliding window operation to the vectorized form of the original document, calculate semantic similarity scores, and rank and select sentences based on their semantic similarity scores. The input device(s) 604 may be used to input a natural language query, and the display device(s) 606 may be used to present the validated and rephrased content to the user. The network interface(s) 608 may facilitate communication with the RAG LLM server 104, the evaluation server 106, and the document database 108. The software components 610, including the operating system 614, the network communication software 616, and the applications 618, may provide the software infrastructure for the operation of the RAG system and the validation process.

While the foregoing is directed to example embodiments described herein, other and further example embodiments may be devised without departing from the basic scope thereof. For example, aspects of the present disclosure (e.g., modules) may be implemented in hardware or software or a combination of hardware and software. One example embodiment described herein may be implemented as a program product for use with a computer system. The program(s) of the program product defines functions of the example embodiments (including the methods described herein) and may be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid-state random-access memory) on which alterable information is stored. Such computer-readable storage media, when carrying computer-readable instructions that direct the functions of the disclosed example embodiments, are example embodiments of the present disclosure.

It will be appreciated by those skilled in the art that the preceding examples are not limiting. It is intended that permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed:

1. A method of validating a Retrieval Augmented Generation (RAG) system, comprising:
receiving rephrased text extracted from a database and rephrased by the RAG system in response to a user query;
searching and extracting corresponding sections from an original document corresponding to the rephrased text;
converting the rephrased text and the corresponding sections of the original document into semantic vectors using natural language processing techniques;
applying a sliding window to the semantic vectors of the corresponding sections of the original document, by systematically moving the sliding window through sentences of the corresponding sections of the original document;
calculating a semantic similarity score between the vectorized rephrased text and the vectorized text within the window for each position of the sliding window;
ranking the sentences based on their semantic similarity scores;
identifying the sentences that have a greatest semantic congruence with the rephrased text;
comparing the semantic similarity score to a predetermined threshold, and considering the rephrased text as semantically congruent and thus validated when the score is above the threshold; and
adjusting the sliding window as a variable size based on a length of the rephrased text.

2. The method of claim 1, further comprising:
performing at least one or more of tokenization, stemming, lemmatization, part-of-speech tagging, and named entity recognition as the natural language processing techniques.

3. The method of claim 1, further comprising:
utilizing a cosine similarity measure, a Jaccard index, or a Euclidean distance when calculating the semantic similarity score.

4. The method of claim 1, further comprising:
ranking the sentences using a machine learning model trained to prioritize sentences based on contextual relevance to the user query.

5. The method of claim 1, further comprising:
utilizing a threshold number of top-ranked sentences to determine the greatest semantic congruence when identifying the sentences.

6. The method of claim 1, further comprising:
reiterating the applying, calculating, ranking, and identifying steps with adjusted parameters when the semantic similarity score does not meet or exceed the predetermined threshold.

7. The method of claim 1, further comprising:
dynamically adjusting the predetermined threshold based on historical validation outcomes for similar types of rephrased text.

8. The method of claim 1, further comprising:
providing a user interface that displays the validated rephrased text alongside the corresponding sections of the original document for user verification.

9. The method of claim 1, further comprising:
validating the rephrased text in real-time as the user interacts with the RAG system, providing immediate feedback on the semantic congruence.

10. A system of validating a Retrieval Augmented Generation (RAG) system, the system comprising a processor configured to:
receive rephrased text extracted from a database and rephrased by the RAG system in response to a user query;
search and extract corresponding sections from an original document corresponding to the rephrased text;
convert the rephrased text and the corresponding sections of the original document into semantic vectors using natural language processing techniques;
apply a sliding window to the semantic vectors of the corresponding sections of the original document, by systematicaly moving the sliding window through sentences of the corresponding sections of the original document;

calculate a semantic similarity score between the vectorized rephrased text and the vectorized text within the window for each position of the sliding window;

rank the sentences based on their semantic similarity scores;

identify the sentences that have a greatest semantic congruence with the rephrased text;

compare the semantic similarity score to a predetermined threshold, and consider the rephrased text as semantically congruent and thus validated when the score is above the threshold; and adjust the sliding window as a variable size based on a length of the rephrased text.

11. The system of claim 10, wherein the processor is further configured to perform at least one or more of tokenization, stemming, lemmatization, part-of-speech tagging, and named entity recognition as the natural language processing techniques.

12. The system of claim 10, wherein the processor is further configured to utilize a cosine similarity measure, a Jaccard index, or a Euclidean distance when calculating the semantic similarity score.

13. The system of claim 10, wherein the processor is further configured to rank the sentences using a machine learning model trained to prioritize sentences based on contextual relevance to the user query.

14. The system of claim 10, wherein the processor is further configured to utilize a threshold number of top-ranked sentences to determine the greatest semantic congruence when identifying the sentences.

15. The system of claim 10, wherein the processor is further configured to reiterate the applying, calculating, ranking, and identifying steps with adjusted parameters when the semantic similarity score does not meet or exceed the predetermined threshold.

16. The system of claim 10, wherein the processor is further configured to dynamically adjust the predetermined threshold based on historical validation outcomes for similar types of rephrased text.

17. The system of claim 10, wherein the processor is further configured to provide a user interface that displays the validated rephrased text alongside the corresponding sections of the original document for user verification.

18. The system of claim 10, wherein the processor is further configured to validate the rephrased text in real-time as the user interacts with the RAG system, providing immediate feedback on the semantic congruence.

* * * * *